(12) United States Patent
Wu et al.

(10) Patent No.: US 10,942,362 B2
(45) Date of Patent: Mar. 9, 2021

(54) PROJECTOR, ELECTRONIC DEVICE HAVING PROJECTOR, AND METHOD FOR OBTAINING DEPTH INFORMATION OF IMAGE DATA

(71) Applicant: HIMAX TECHNOLOGIES LIMITED, Tainan (TW)

(72) Inventors: Biing-Seng Wu, Tainan (TW); Han-Yi Kuo, Tainan (TW); Kuan-Ming Chen, Tainan (TW); Li-Chiu Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 289 days.

(21) Appl. No.: 16/150,251

(22) Filed: Oct. 2, 2018

(65) Prior Publication Data

US 2020/0103672 A1  Apr. 2, 2020

(51) Int. Cl.
*G02B 27/42* (2006.01)
*G02B 27/18* (2006.01)
*G03B 21/20* (2006.01)

(52) U.S. Cl.
CPC ......... *G02B 27/4222* (2013.01); *G02B 27/18* (2013.01); *G03B 21/206* (2013.01); *G03B 21/2033* (2013.01)

(58) Field of Classification Search
CPC ............... G02B 27/4222; G02B 27/18; G03B 21/2033; G03B 21/206
See application file for complete search history.

(56) References Cited

U.S. PATENT DOCUMENTS

| | | | |
|---|---|---|---|
| 9,918,073 B2* | 3/2018 | Ko | G01S 17/894 |
| 2011/0310220 A1* | 12/2011 | McEldowney | G02B 5/1895 |
| | | | 348/42 |
| 2012/0051588 A1* | 3/2012 | McEldowney | G03B 21/14 |
| | | | 382/103 |
| 2018/0059430 A1 | 3/2018 | Mor | |

FOREIGN PATENT DOCUMENTS

CN  108169981 A  6/2018

* cited by examiner

*Primary Examiner* — Collin X Beatty
(74) *Attorney, Agent, or Firm* — Winston Hsu

(57) ABSTRACT

The present invention provides a projector, wherein the projector includes a light-emitting device, a lens module having a diffuser part and a lens part, and a DOE. In the operations of the projector, the light-emitting device is arranged for generating at least one laser beam, and the at least one laser beam passes through the diffuser part and the DOE to illuminate a field of view, and the at least one laser beam passes through the lens part and the DOE to generate a plurality of dots.

14 Claims, 7 Drawing Sheets

PROJECTOR, ELECTRONIC DEVICE HAVING PROJECTOR, AND METHOD FOR OBTAINING DEPTH INFORMATION OF IMAGE DATA

BACKGROUND OF THE INVENTION

1. Field of the Invention

The present invention relates to a projector, and more particularly, to a projector having a diffraction optical element.

2. Description of the Prior Art

In order to obtain 3D images, an electronic device may use a projector for projecting a special pattern to an object in a surrounding region, and use camera to capture the image having the object with the special pattern thereon, and the captured image is analyzed by a processor to obtain the depth information of the image. In addition, in order to identify the contents of the captured image, the electronic device may further use a light illuminator to increase the ambient light to make the captured image be more clearly. However, setting the projector and the light illuminator in the electronic device may increase the design loading and the manufacturing costs.

SUMMARY OF THE INVENTION

It is therefore an objective of the present invention to provide a projector, which can serves as the illuminator and pattern generator simultaneously, to solve the above-mentioned problem.

According to one embodiment of the present invention, a projector is disclose, wherein the projector includes a light-emitting device, a lens module having a diffuser part and a lens part, and a DOE. In the operations of the projector, the light-emitting device is arranged for generating at least one laser beam, and the at least one laser beam passes through the diffuser part and the DOE to illuminate a field of view, and the at least one laser beam passes through the lens part and the DOE to generate a plurality of dots.

According to one embodiment of the present invention, an electronic device having a projector and a camera module is provided, wherein the projector includes a light-emitting device, a lens module having a diffuser part and a lens part, and a DOE. In the operations of the projector, the light-emitting device is arranged for generating at least one laser beam, and the at least one laser beam passes through the diffuser part and the DOE to illuminate a field of view, and the at least one laser beam passes through the lens part and the DOE to generate a plurality of dots to generate an output image of the projector to a surrounding environment. The camera module is arranged for capturing the region of the surrounding environment to generate image data According to one embodiment of the present invention, a method for obtaining depth information of image data is disclosed, wherein the method comprises the step of: controlling a projector to project an output image having an uniform illumination with a plurality of dots to a surrounding environment; capturing the region of the surrounding environment to generate image data corresponding to the output image; and analyzing the image data to obtain the depth information of image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
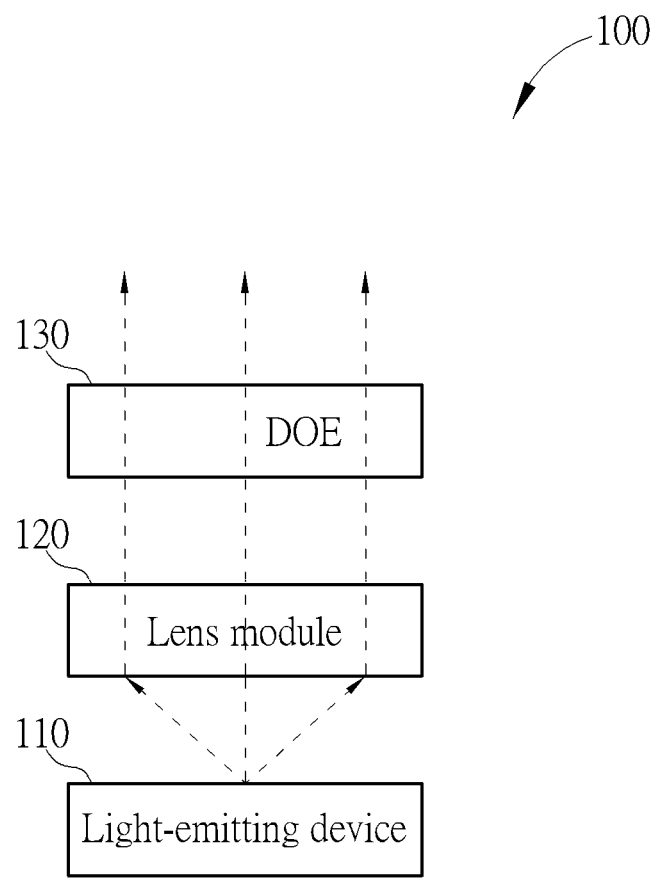
FIG. 1 is a diagram illustrating a projector according to one embodiment of the present invention.

FIG. 1 is a diagram illustrating a projector 100 according to one embodiment of the present invention. As shown in FIG. 1, the projector 100 comprises a light-emitting device 110, a lens module 120 and a diffraction optical element (DOE) 130. In this embodiment, the light-emitting device 110 may be a laser diode or a vertical-cavity surface-emitting laser (VCSEL) for generating infrared laser beam(s), the lens module 120 comprises a diffuser part and a lens part, and the DOE 130 may serves as a pattern generator, and the DOE 130 may be imprinted on a substrate of the lens module 120.

Figure 2:
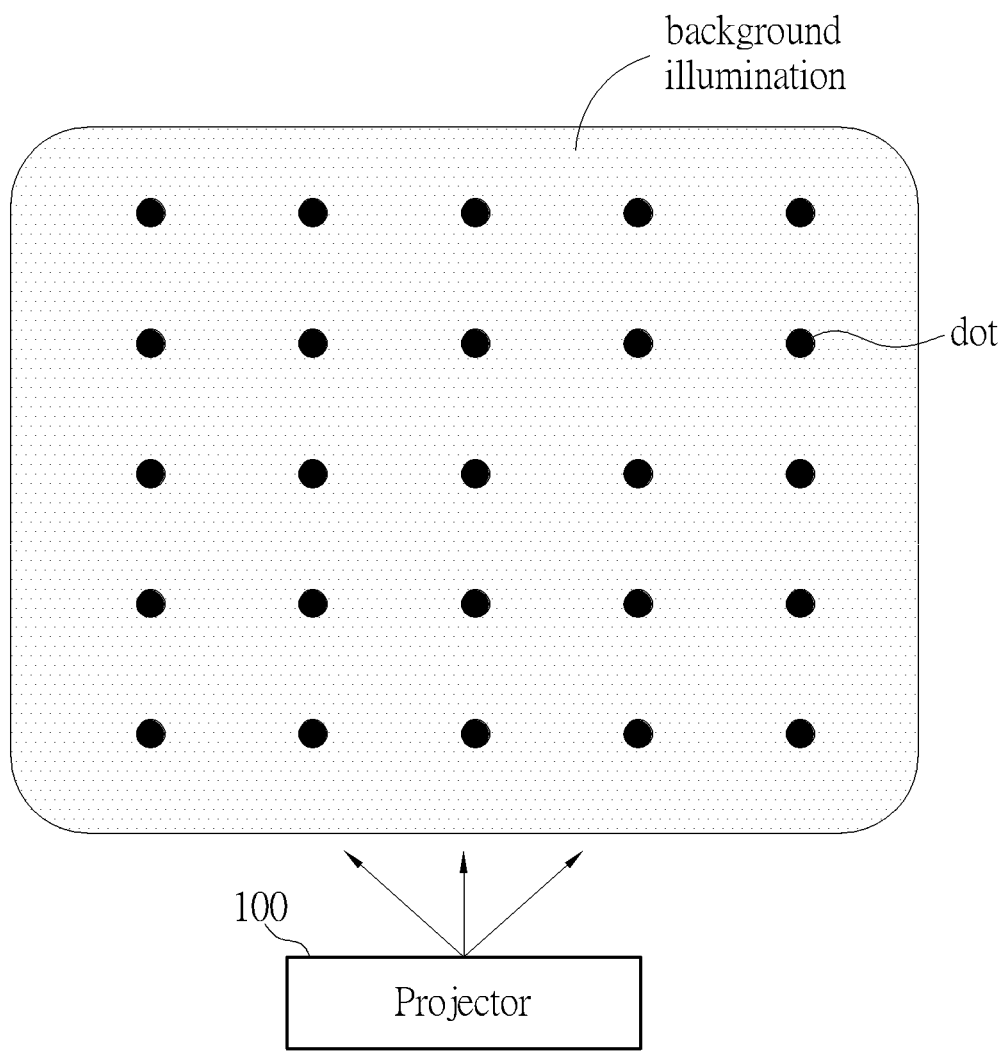
FIG. 2 shows the output image of the projector according to one embodiment of the present invention.

In the operations of the projector 100, the light-emitting device 110 is arranged to generate at least one laser beam, and the laser beam passes through the diffuser part of the lens module 120 and the DOE 130 to generate an uniform illumination, and the laser beam passes through the lens part of the lens module 120 and the DOE 130 to generate a plurality of dots, to generate an output image of the projector 100. FIG. 2 shows the output image of the projector 100 according to one embodiment of the present invention. As shown in FIG. 2, the uniform illumination serves as a background illumination for increasing the ambient light, and the pattern of the plurality of dots (which are similar to the pattern of the DOE 130) within the uniform illumination is for the 3D image generation. In addition, the arrangements of the dots shown in FIG. 2 are for illustrative purposes only, that is the dots (DOE pattern) may have any other appropriate arrangement.

In this embodiment, the uniform illumination and the plurality of dots are generated simultaneously, that is the projector 100 can serve as the illuminator and the pattern generator. Therefore, the designs of an electronic device having the projector 100 are easier and flexible, and the manufacturing cost is better than the prior art electronic device having the distinct pattern generator and the illuminator.

Figure 3:
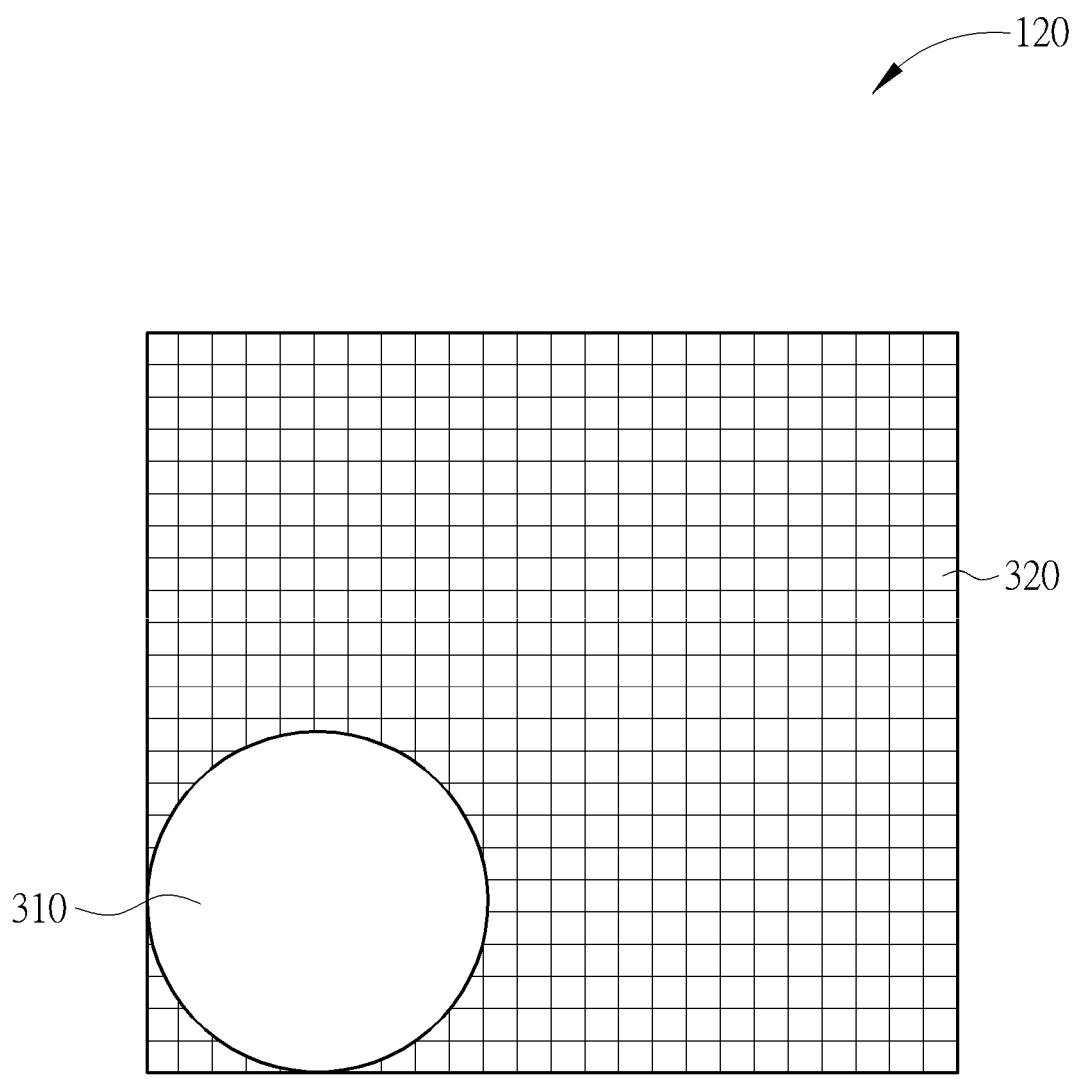
FIG. 3 shows the lens module according to one embodiment of the present invention.

FIG. 3 shows the lens module 120 according to one embodiment of the present invention. The lens module 120 comprises a single lens 310 and a micro-lens array 320, wherein the lens 310 serves as the lens part of the lens module 120, and the micro-lens array 320 serves as the diffuser part of the lens module 120.

Figure 4:
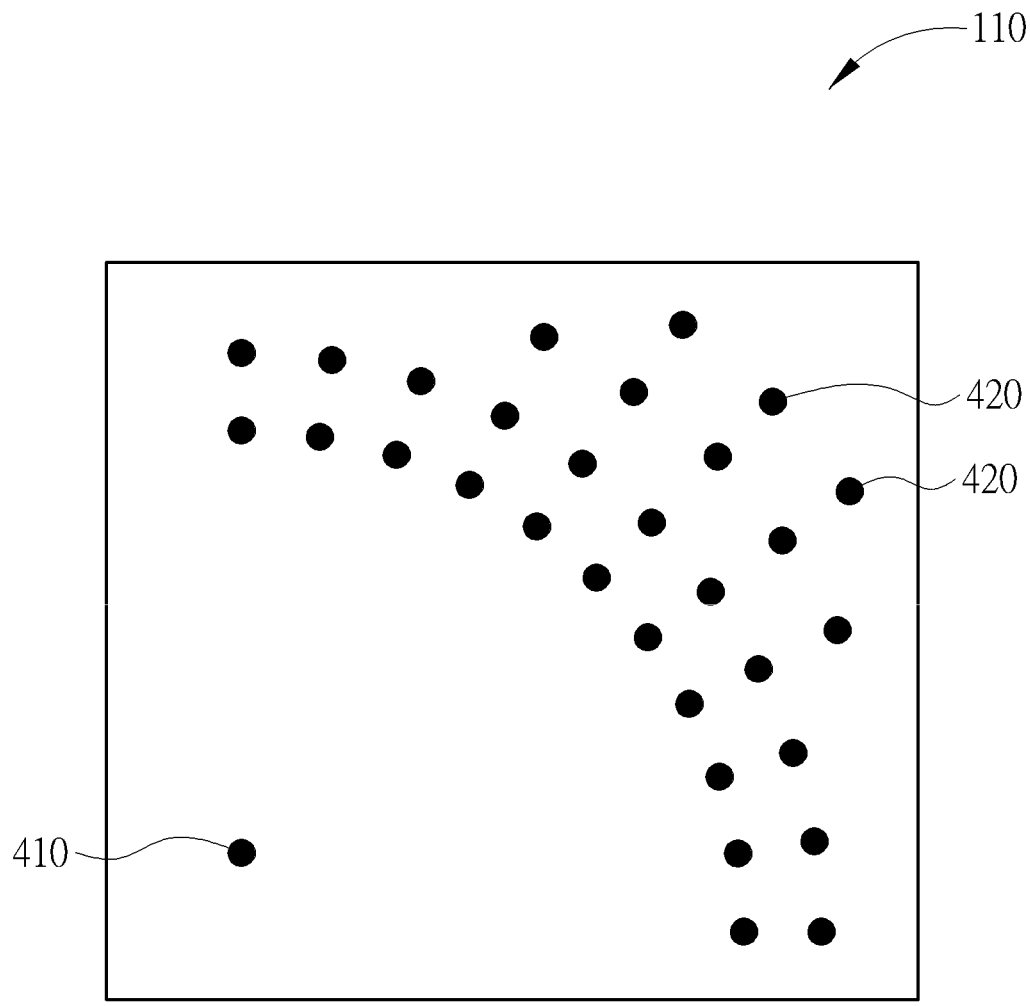
FIG. 4 shows the light-emitting device according to one embodiment of the present invention.
Figure 5:
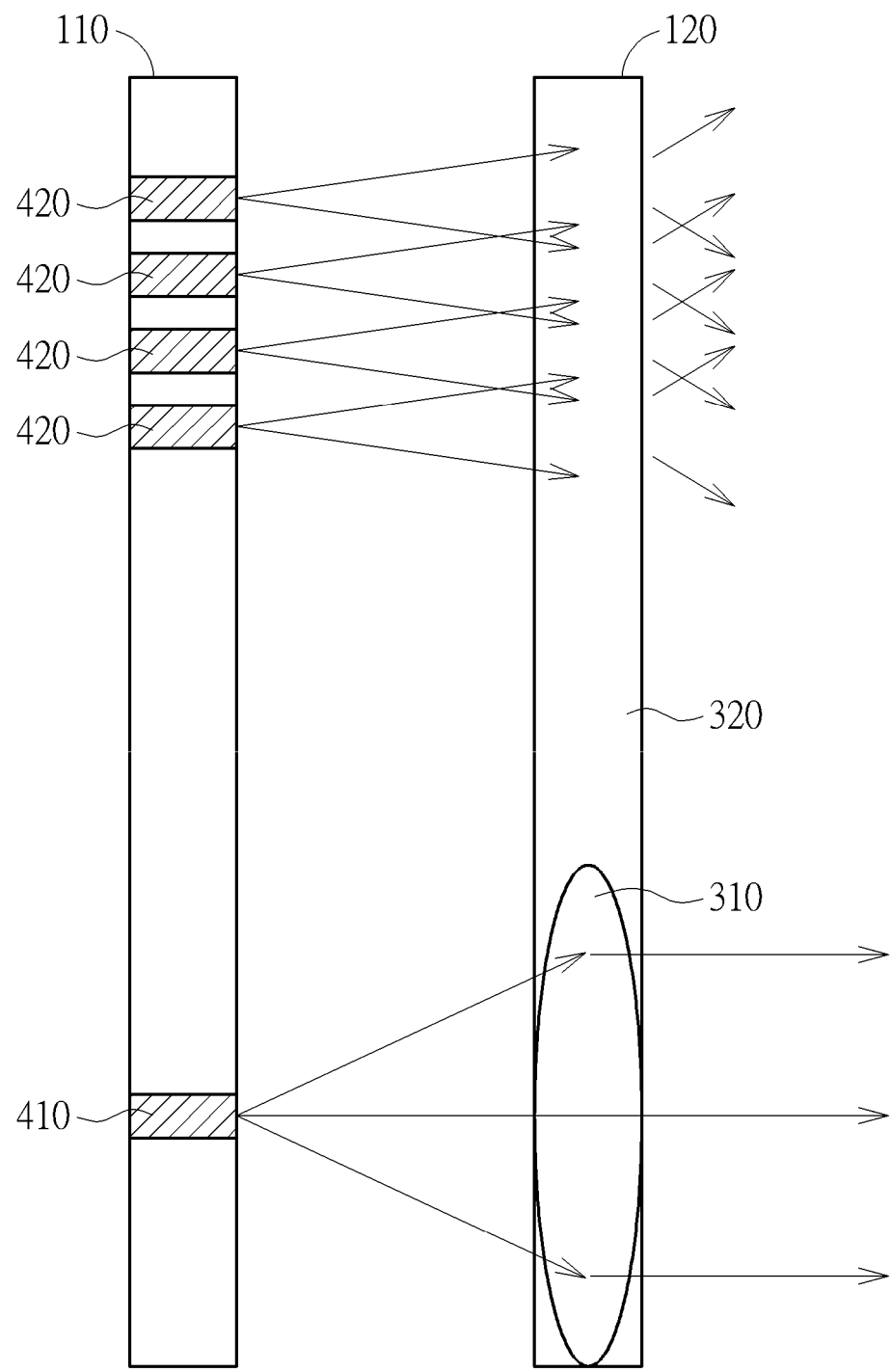
FIG. 5 shows the collimated laser beam and the scattered light generated by the light-emitting device and the lens module.

FIG. 4 shows the light-emitting device 110 according to one embodiment of the present invention. The light-emitting device 110 shown in FIG. 4 is a VCSEL having a first laser emitter 410 and a plurality of second laser emitters 420 (there are thirty-two second laser emitter 420 in FIG. 4). In this embodiment, the first laser emitter 410 is positioned corresponding to a center of the lens 310 shown in FIG. 3, and the plurality of second laser emitters 420 are positioned far away from the first laser emitter 410 to make the lens 310 not receive the laser beams generated by the second laser emitters 420. Taking FIG. 5 as an example, only the first laser emitter 410 generates the laser beam to the lens 310 of the lens module 120, and the lens 310 does not receive any laser beam generated by the second laser emitters 420. That is the laser beams generated by the second laser emitters 420 are all scattered or diffused by the micro-lens array 320.

In the embodiments shown in FIGS. 2-5, the laser beam generated by the first laser emitter is focused by the lens 310 to generate a collimated laser beam, and DOE 130 receives the collimated laser beam to generate the plurality of dots shown in FIG. 2. In addition, the laser beams generated by the second laser emitters are scattered or diffused by the micro-lens array 320, and the scattered lights pass through the DOE 130 to generate the backlight illumination (the DOE pattern of the backlight illumination is too weak to be identified) shown in FIG. 2.

It is noted that the lens module 120 shown in FIG. 3 and the light-emitting device 110 shown in FIG. 4 are for illustrative purposes only. In other embodiments of the present invention, the lens module 120 may have two or more lenses 310 for focusing the received laser beam, and/or the lens 310 may have different positions (e.g. the center or another corner of the lens module 120), and/or the light-emitting device 110 may have two or more first laser emitters 410 for generating a plurality of laser beams to the lens 310. In addition, the first laser emitter 410 and the second laser emitters 420 can operate independently, that is the first laser emitter 410 and the second laser emitters 420 may not be turned on simultaneously. As long as the light-emitting device 110 and the lens module 120 are designed to generate the collimated laser beam and the scatter light simultaneously, the light-emitting device 110 and the lens module 120 may have different structures.

Figure 6:
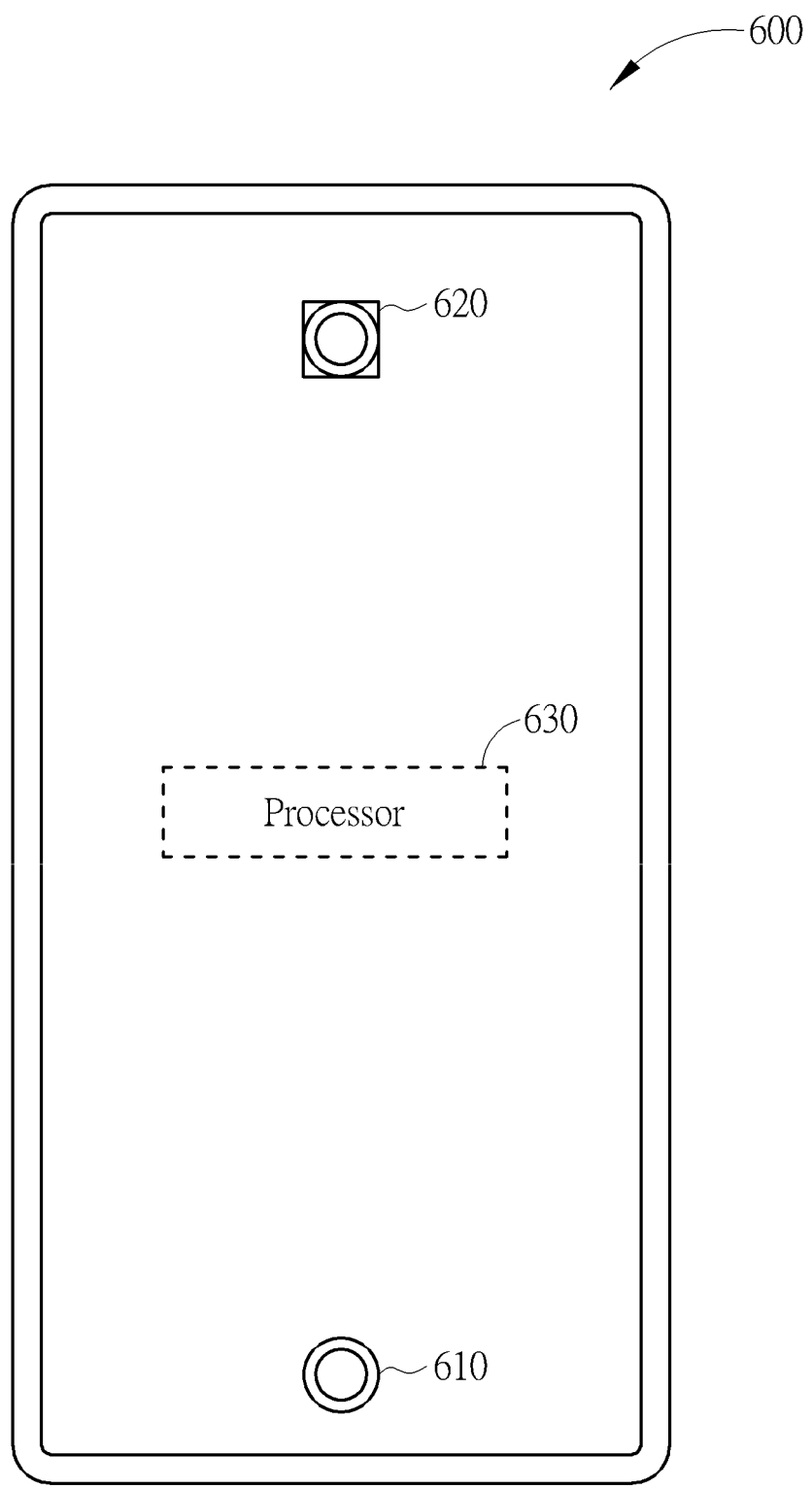
FIG. 6 is a diagram illustrating an electronic device according to one embodiment of the present invention.

FIG. 6 is a diagram illustrating an electronic device 600 according to one embodiment of the present invention. As shown in FIG. 6, the electronic device 600 is a smart phone, and the electronic device 600 comprises the projector 610, a camera module 620 and a processor 630. In this embodiment, the projector 610 may be the projector 100, and is embedded in a back side of the electronic device 600, and the projector 610 is used to project the infrared output image with special pattern (i.e. the DOE pattern) to an object in a surrounding environment. Then, the camera module 620 captures the object with the special pattern in the surrounding environment to generate image data. Finally, the processor 630 analyzes the image data to obtain depth information of the image data (i.e. depth information of the object) to generate a 3D image.

In the embodiment show in FIG. 6, the projector 610 is embedded in the back side of the electronic device 800. In another embodiment, however, the projector 610 and the camera module can be positioned in the face of the electronic device.

Figure 7:
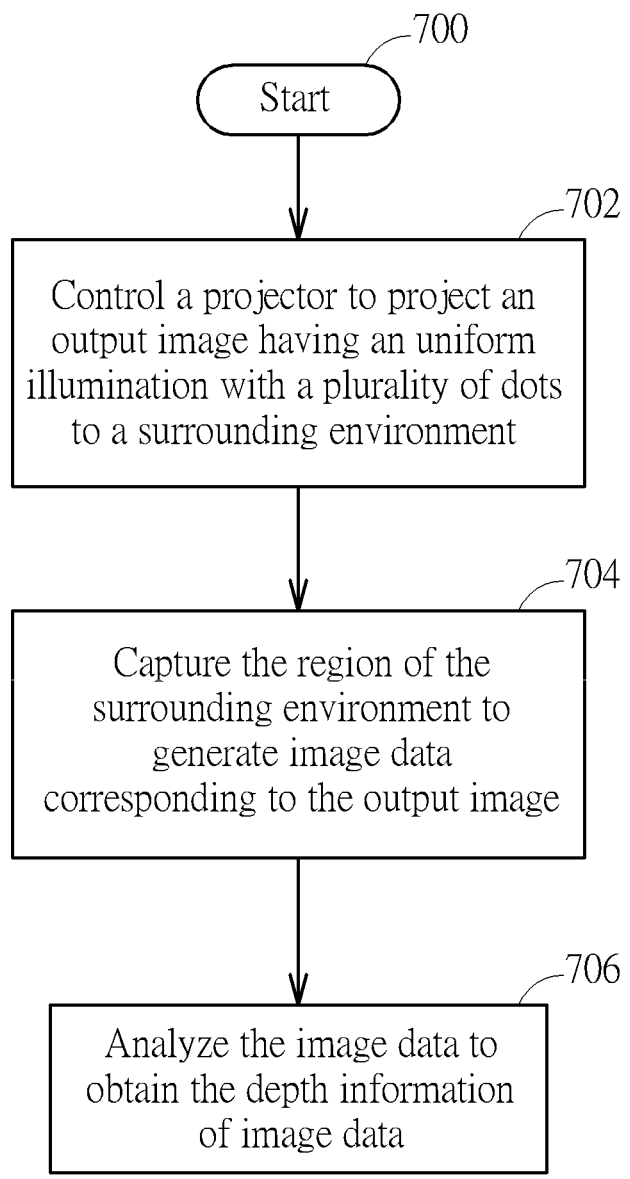
FIG. 7 is a flowchart of a method for obtaining depth information of image data according to one embodiment of the present invention.

FIG. 7 is a flowchart of a method for obtaining depth information of image data according to one embodiment of the present invention. Refer to FIGS. 1-7, the flow is described as follows.

Step 700: the flow starts.

Step 702: control a projector to project an output image having an uniform illumination with a plurality of dots to a surrounding environment.

Step 704: capture the region of the surrounding environment to generate image data corresponding to the output image.

Step 706: analyze the image data to obtain the depth information of image data.

Briefly summarized, in the projector of the present invention, the projector can serve as the illuminator and the pattern generator simultaneously, that is the output image projected by the projector has an uniform illumination with a plurality of dots, where the uniform illumination can increase the ambient light while the plurality of dots can be used to generate the 3D image. Therefore, the designs of an electronic device having the projector are easier and flexible, and the manufacturing cost is better than the prior art electronic device having the distinct pattern generator and the illuminator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector, comprising:
a light-emitting device, for generating at least one laser beam;
a lens module having a diffuser part and a lens part, wherein the lens module has a single lens serving as the lens part, the single lens is at a corner of the lens module, and the other region of the lens module is a micro-lens array serving as the diffuser part; and
a diffraction optical element (DOE);
wherein the at least one laser beam passes through the diffuser part and the DOE to illuminate a field of view, the at least one laser beam passes through the lens part and the DOE to generate a plurality of dots.

2. The projector of claim 1, wherein the at least one laser beam passes through the diffuser part and the DOE to generate an uniform illumination, and the uniform illumination and the plurality of dots serve as an output image of the projector.

3. The projector of claim 2, wherein the uniform illumination and the plurality of dots are simultaneously outputted to a surrounding area of the projector.

4. The projector of claim 2, wherein for the output image of the projector, the plurality of dots are within a region of the uniform illumination.

5. The projector of claim 1, wherein the diffuser part is a micro-lens array.

6. The projector of claim 1, wherein the light-emitting device is a vertical-cavity surface-emitting laser (VCSEL) having a plurality of laser emitters for generating a plurality of laser beams.

7. The projector of claim 6, wherein only a portion of the laser emitters generates the laser beam(s) to the lens part of the lens module, and the lens part does not receive the laser beams generated by the other portion of the laser emitters.

8. An electronic device, comprising:
a projector, comprising:
a light-emitting device, for generating at least one laser beam;
a lens module having a diffuser part and a lens part, wherein the lens module has a single lens serving as the lens part, the single lens is at a corner of the lens module, and the other region of the lens module is a micro-lens array serving as the diffuser part; and a diffraction optical element (DOE); wherein the at least one laser beam passes through the diffuser part and the DOE to illuminate a field of view, the at least one laser beam passes through the lens part and the DOE to generate a plurality of dots to generate an output image of the projector to a surrounding environment; and a camera module, for capturing the region of the surrounding environment to generate image data.

9. The electronic device of claim 8, wherein the at least one laser beam passes through the diffuser part and the DOE to generate an uniform illumination, and the uniform illumination and the plurality of dots are simultaneously outputted to the surrounding area of the projector.

10. The electronic device of claim 9, wherein for the output image of the projector, the plurality of dots are within a region of the uniform illumination.

11. The electronic device of claim 8, wherein the diffuser part is a micro-lens array.

12. The electronic device of claim 8, wherein the light-emitting device is a vertical-cavity surface-emitting laser (VCSEL) having a plurality of laser emitters for generating a plurality of laser beams.

13. The electronic device of claim 12, wherein only a portion of the laser emitters generates the laser beam(s) to the lens part of the lens module, and the lens part does not receive the laser beams generated by the other portion of the laser emitters.

14. A method for obtaining depth information of image data, comprising:

controlling a projector to project an output image having an uniform illumination with a plurality of dots to a surrounding environment;

capturing the region of the surrounding environment to generate image data corresponding to the output image; and analyzing the image data to obtain the depth information of image data;

wherein the step of controlling the projector to project the output image having the uniform illumination with the plurality of dots to the surrounding environment comprises:

using a light-emitting device to generate at least one laser beam;

providing a lens module having a diffuser part and a lens part, wherein the lens module has a single lens serving as the lens part, the single lens is at a corner of the lens module, and the other region of the lens module is a micro-lens array serving as the diffuser part;

providing a diffraction optical element (DOE);

wherein the at least one laser beam passes through the diffuser part and the DOE to generate the uniform illumination, and the at least one laser beam passes through the lens part and the DOE to generate the plurality of dots.

* * * * *